United States Patent [19]
Van Brunt et al.

[11] Patent Number: 5,412,698
[45] Date of Patent: May 2, 1995

[54] ADAPTIVE DATA SEPARATOR

[75] Inventors: Roger Van Brunt, San Francisco; Daniel L. Hillman, San Jose, both of Calif.; Christopher Nilson, Seattle, Wash.; Florin Oprescu, Sunnyvale; Michael D. Teener, Santa Cruz, both of Calif.

[73] Assignee: Apple Computer, Inc., Cupertino, Calif.

[21] Appl. No.: 25,712

[22] Filed: Mar. 16, 1993

[51] Int. Cl.[6] .............................................. H03L 7/00
[52] U.S. Cl. ................................... 375/373; 375/371; 327/98; 327/141
[58] Field of Search ............... 375/106, 110, 111, 113, 375/118, 119; 370/94.2, 13, 79, 100.1, 108; 307/409–410, 480, 231, 269, 510; 328/55–57, 72, 75, 63

[56] References Cited

U.S. PATENT DOCUMENTS

| | | | |
|---|---|---|---|
| 4,386,323 | 5/1983 | Jansen | 328/63 |
| 4,756,011 | 7/1988 | Cordell | 375/118 |
| 4,805,197 | 2/1989 | Van Der Jagt et al. | 375/110 |
| 4,841,551 | 6/1989 | Avaneas | 375/118 |
| 5,022,057 | 6/1991 | Nishi et al. | 375/119 |

FOREIGN PATENT DOCUMENTS

0094865 11/1983 European Pat. Off. .

Primary Examiner—Stephen Chin
Assistant Examiner—Young Tse
Attorney, Agent, or Firm—Blakely, Sokoloff, Taylor & Zafman

[57] ABSTRACT

An adaptive data separator for detecting systematic differences between the arrivals of the rising and falling edges of a digital signal and for compensating for the difference. Data packets from a transmission source are prefixed with two data bits of known values. The data separator is also supplied with four clock signals per bit, one corresponding to an ideal rising edge and three following every 5 nanoseconds. The two prefix bits preceding a data packet are then sampled at each of the clock signals. Since all information in a given data packet undergoes the same systematic distortion, the logic of the adaptive data separator can determine the optimum clock signal to use in sampling each bit of data for the packet. Through several multiplexers the incoming data is then clocked to the optimal clock signal for sampling.

21 Claims, 7 Drawing Sheets

FIG. 7

ADAPTIVE DATA SEPARATOR

BACKGROUND OF THE INVENTION

1. Field of the Invention

The present invention generally relates to serial data bus communication systems. More particularly, the present invention relates to an adaptive data separator capable of recovering encoded information from an encoded signal which may have been subject to systematic distortion of signal edges.

2. Description of Related Art

Computer systems incorporate many components, each of which must generally be capable of either conveying or receiving information from other parts of the system. Numerous data communications schemes have been developed for the exchange of data between the various components and peripherals implemented in a given computer system.

Figure 1:
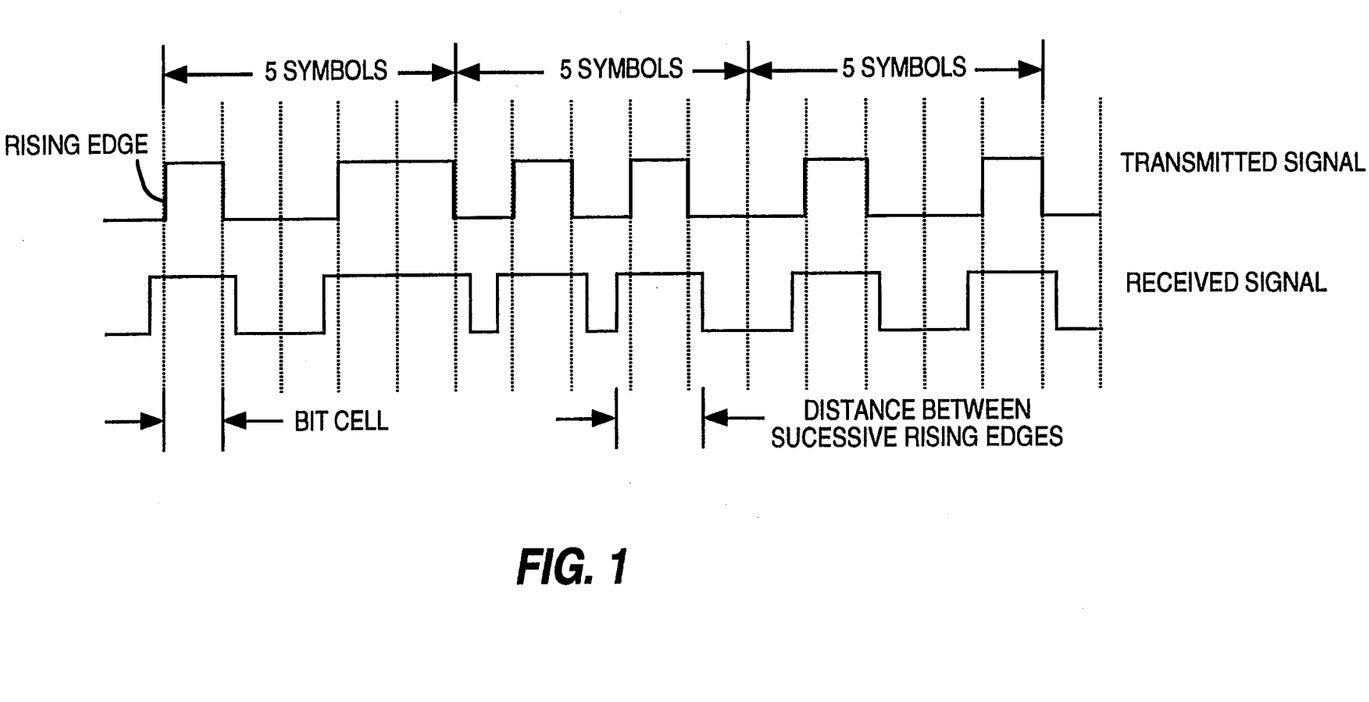
FIG. 1 is a graphical representation of a serial data bus transmission signal and resulting received signal in the presence of duty-cycle distortion.

One of the prominent methods of data communications within computer systems is the use of a serial data bus for transmitting encoded information. If a single data line is used for transmission, then usually the clock information and data information are combined. A variety of conventional encoding schemes are employed to send combined clock and data transmissions over a single data line. Examples are Manchester, 4B5B and 8B10B. Transmissions encoded in, for example, binary 4B5B encode 4 bits of data in 5 NRZ binary symbols. The purpose of the encoding is to guarantee both a dc balanced signal and enough transitions for clock extraction circuits to be able to extract the clock signal. A typical sequence of symbols within a transmitted signal is shown in FIG. 1. As can be seen, each symbol of the transmitted signal fills a bit cell. For 40 megabit 4B5B data, the symbol rate is 50 Mbaud and the bit cell is 20 nanoseconds. Co-pending patent application entitled "Delay Line Separator for Data Bus," application Ser. No. 08/004,441, filed Jan. 19, 1993, invented by Roger Van Brunt and Florin Oprescu and assigned to the assignee of the present invention describes a method and apparatus for extracting clock information from combined clock/data packets propagated according to the IEEE 1394 standard.

Data transmission systems often introduce systematic distortion of signal edges with the rising edge delayed longer than the falling edge or vice versa. If this distortion is too large, data recovery using conventional methods becomes impossible since those methods depend on the symmetry of the rising and falling edge distortion. A number of different types of noise or distortion can affect a packet as it is transmitted over a serial data bus. Of particular interest to short range, high speed data burst transmissions is a systematic distortion which uniformly varies the duty cycle of the symbols within the data packet. Referring again to FIG. 1, a symbol within a transmitted signal is bounded by a rising edge and sharp falling edge and has a width equal to the bit cell, typically 20 nanoseconds for 50 Mbaud 4B5B. However, during transmission of the packet, a pulse corresponding to a single symbol is broadened or narrowed, such that the time between a rising edge and a succeeding falling edge is increased or decreased. Such a systematic error is represented in FIG. 1 by the received signal, which includes rising edges advanced by one or two nanoseconds and falling edges delayed by one or two nanoseconds. With such distortion, each high symbol is broadened and spacing between high symbols is decreased. Thus, whereas the bit cell width of the transmitted signal is easily determined from the time between rising and falling edges, the bit cell width cannot be easily determined from the time between rising and falling edges of the received signal. Although shown as broadening each signal, systematic distortion of the kind described can also narrow each symbol, thus broadening or narrowing of symbols can be quite significant, often resulting in an initial 20 nanosecond symbol being expanded to a width of 30 nanoseconds or narrowed to a width of 10 nanoseconds.

A unique feature of the systematic distortion is that the distance between successive rising edges is unaffected by the distortion. This is true because the source of the distortion affects each symbol pulse in the same manner and by the same amount such that all rising edges are advanced or delayed by a certain amount and all falling edges are advanced or delayed by a certain amount. Such systematic distortion is commonly referred to as duty-cycle distortion and may arise from a rise/fall time mismatch or from offsets in the receiver. Other types of distortion, which do not preserve the time between successive rising edges, include external noise, transient noise and inter-symbol interference. However, during transmission and reception of the packet, the symbol pulse widths are distorted such that high symbol pulse widths are increased (decreased) while low symbol pulse widths are correspondingly decreased (increased) by the same amount. This distortion may vary from packet to packet but does not vary during a packet transmission. The amount of broadening and narrowing of the symbols can be quite significant, often resulting in an initial 20 nanosecond symbol bit cell being expanded to a width of 30 nanoseconds while the opposite value symbol is decreased to 10 nanoseconds.

Heretofore, no effective techniques have been developed which allow the accurate sampling of data information from a high speed clock/data burst in the presence of significant duty-cycle distortion. Techniques which have addressed the problem are either not sufficiently effective in accurately determining the data signal or are complex, thus rendering the system expensive.

SUMMARY OF THE INVENTION

From the foregoing, it can be appreciated that there is a need to provide an adaptive data separator for processing high speed bursts of data packets received along a serial data bus line to determine bit values, particularly in circumstances when the transmitted signal is subject to systematic duty-cycle distortion. Therefore, it is an object of the present invention to provide an adaptive data separator for optimally sampling data bit cells in a communications signal which may be subject to systematic duty-cycle distortion.

It is also an object of the present invention to provide the above adaptive data separator capable of processing differential communication signals.

It is another object of the present invention to provide an adaptive data separator for use in a CMOS communication scheme at CMOS digital signal levels.

It is also an object of the present invention to provide an adaptive data separator which can adapt to a data packets distortion in a minimal number of bits.

It is also an object of the present invention to provide a detection signal indicating that a data packet has been received.

It is also an object of the present invention to provide an adaptive data separator for use in a high speed burst mode serial communications system in which signal clocking information is combined with data information for transmission over a single serial transmission line.

These and other objects of the present invention are provided by an adaptive data separator for detecting systematic differences between the arrivals of the rising and falling edges of a digital signal and for compensating for the difference. Data packets from a transmission source are prefixed with data bits of known values. The data separator is also supplied with four clock signals per bit, one corresponding to an ideal rising or falling edge and three following every 5 nanoseconds. The prefix bits preceding a data packet are then sampled at each of the clock signals with the three following clocks. Since all information in a given data packet undergoes the same systematic distortion, the logic of the adaptive data separator can determine the optimum clock signal to use in sampling each bit of data for the packet. Through several multiplexers the incoming data is then clocked to the optimal clock signal for sampling.

BRIEF DESCRIPTION OF THE DRAWINGS

The objects, features and advantages of the present invention will be apparent from the following detailed description in which.

DETAILED DESCRIPTION OF THE INVENTION

A method and apparatus are described for an adaptive data separator for extracting data from a data transmission of serial data packets in which the received data may be subject to systematic duty-cycle distortion during the propagation from the source to the receiver. In the following description, many specific details are set forth such as specific time separations of signals, etc., in order to provide a thorough understanding of the present invention. It will be apparent, however, to one of ordinary skill in the art that the present invention may be practiced without such specific details. In other instances, well-known structures and techniques have not been described in detail in order not to obscure unnecessarily the present invention.

The preferred embodiment of the present invention is intended to be incorporated into a data bus receiving module for use in a system in which clock and data information are combined. Co-pending patent application, "Delay of Line Separator for Data Bus" assigned to the assignee of the present invention describes a preferred embodiment method and apparatus for extracting clock signal information from combined clock/data signal packets. It should be borne in mind that the adaptive data separator of the present invention is not limited to such an application and may find application in other signaling protocols where, for example, clock information and data information are transmitted separately.

Figure 2:
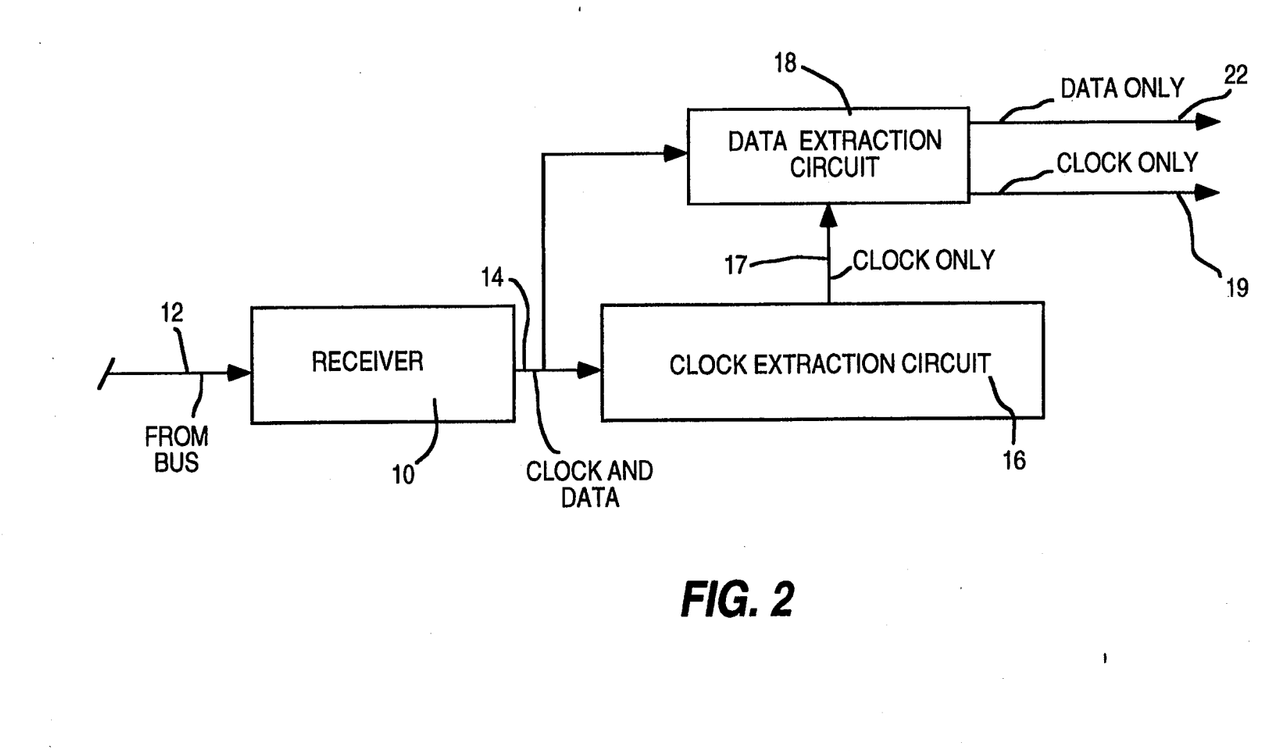
FIG. 2 provides a block diagram of a serial data bus receiver.

Referring now to FIG. 2, an overview of a backplane data bus receiving module for receiving a combined clock/data signal and for extracting the data and clock components from the signal are shown. The module includes a receiver unit 10 connected to bus line 12. Receiver 10 receives combined clock/data signals over serial bus 12 from a data transmitter (not shown) at the source of the information. The combined clock/data signal is output from receiver 10 along data line 14 to both a clock extraction circuit 16 and a data extraction circuit 18. Clock extraction circuit 16 processes the combined clock/data packets to isolate a clock signal within the packet for transmission to data extraction circuit 18 along data line 17. Data extraction circuit 18 uses the clock signal received along data line 17 to sample the combined clock/data packets received along data line 14 to extract the data from the combined signal. The resulting extracted data is output along with clock line 19 to a computer module (not shown) or other device. Serial bus line 12, receiver 10 and data lines 14, 17, 19 and 22 may be entirely conventional and will not be described in further detail herein. The clock extraction circuit 16 may be that described in the above referenced co-pending U.S. patent application or other means for extracting the clock signal and generating the additional clock signals to be described further herein. The data extraction circuit 18 which incorporates the adaptive data separator of the present invention will now be described in further detail below with reference to the remaining figures.

Figure 3:
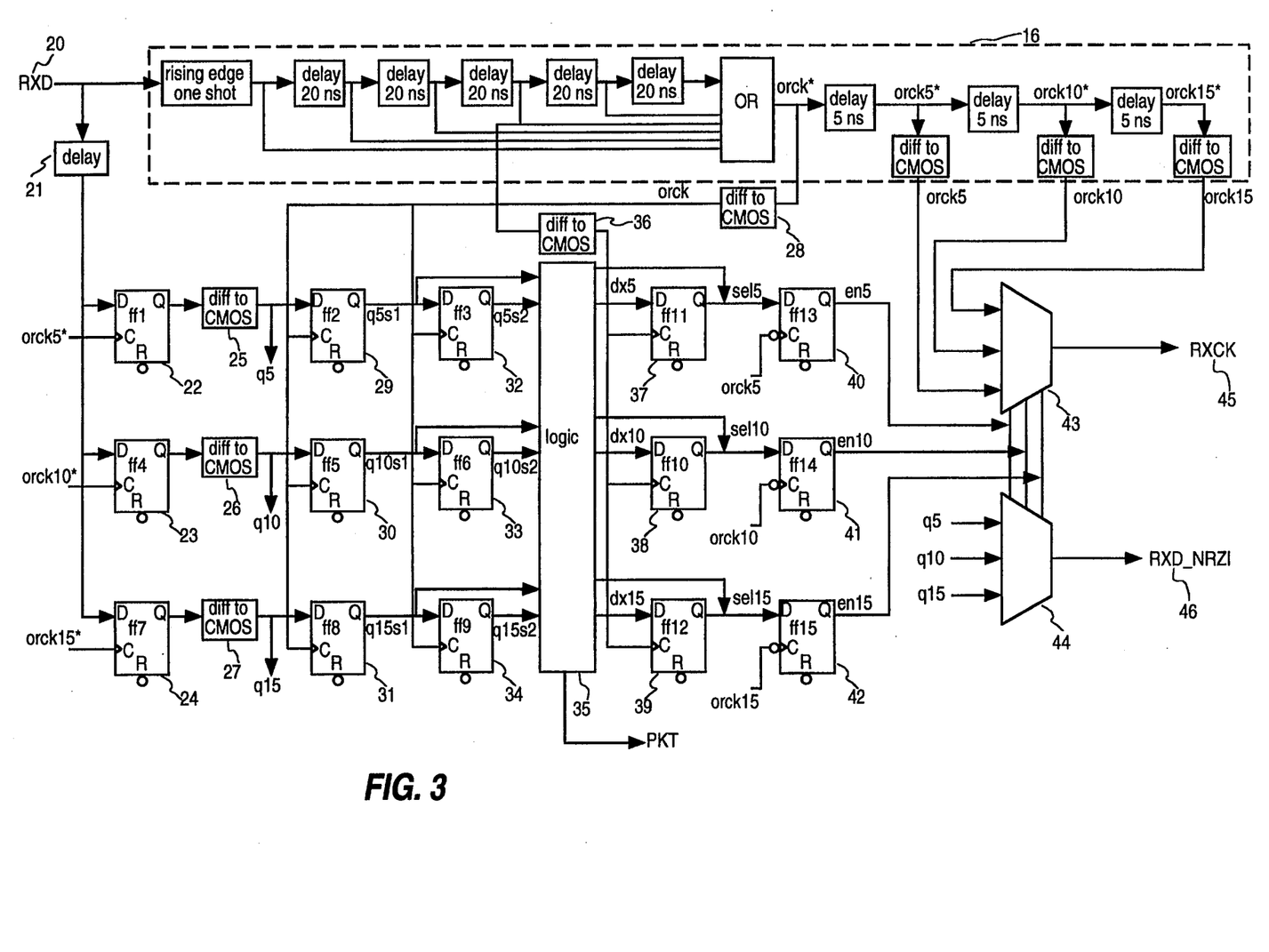
FIG. 3 is a diagram of an adaptive data separator constructed in accordance with one embodiment of the present invention.

While the present invention may be practiced with a number of different transmission protocols for the purposes of illustration, a transmission packet comprising bit cells taking 20 nanoseconds will be assumed. FIG. 3 shows a detailed logic diagram of pertinent aspects of the present invention. The clock extraction circuit 16 is illustrated in box 16 of FIG. 3 with a number of details that will not be described herein other than to explain the resulting clock signals from that circuit. The data coming into the receiver module of the present invention is indicated as RXD data 20 coming from bus line 12 (not shown). In accordance with the preferred embodiment of the present invention, this signal coming in is a differential signal and not at the CMOS digital level. Of course, the present invention may be practiced in which the incoming data is already at the CMOS digital level. The clock extraction circuit 16 processes the incoming RXD signal and generates from that four clock signals. These are the orck clock signals which ideally corresponds to the start of each bit cell followed by three other successively delayed clock signals. The orck5 clock signal follows the orck signal by 5 nanoseconds. The orck10 clock signal is delayed another 5 nanoseconds and likewise, orck15 is delayed an additional 5 nanoseconds. One of the three clock signals, orck5, orck10 and orck15 will be determined by the adaptive data separator of the present invention to be the best for sampling each bit of data in a given data packet.

Because the present invention is intended to be used with high speed serial data packet transmission, it is essential that a minimal amount of overhead for each packet be required for adaptive data separation. In the preferred embodiment of the present invention, only two bits of data need be appended to the front of each packet. From the two preceding preamble bits, it will be possible to detect and compensate for the duty-cycle distortion of the associated packet. Before describing the remaining portion of the adaptive data separator of FIG. 3, reference should be made to FIG. 4 for describing the method to be carried out by the circuitry of FIG. 3.

Figure 4:
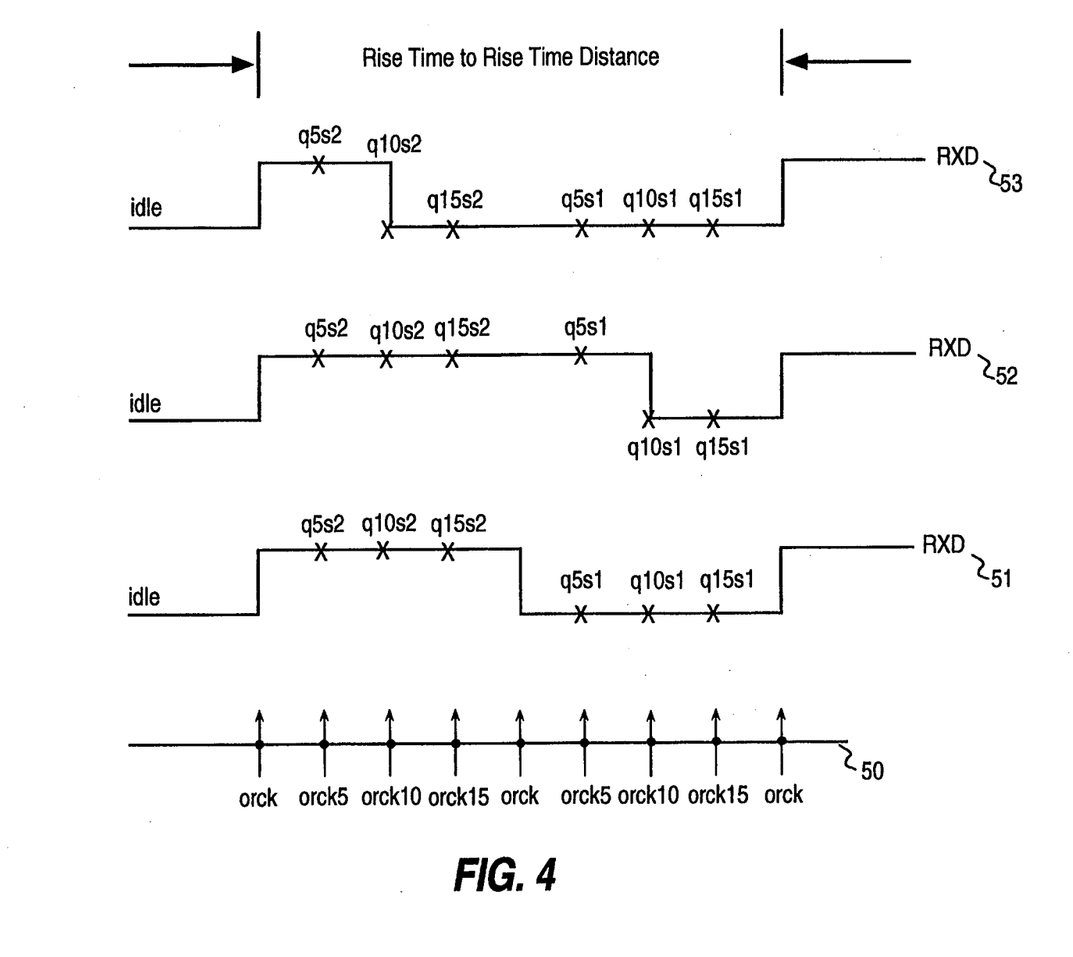
FIG. 4 is a graphical illustration of a sequence of pulse trains undergoing various duty-cycle distortions.

FIG. 4 illustrates three two-bit data samples from different packets undergoing different duty-cycle distortions. As can be seen, the first of the preamble bits in the two-bit series must be in the opposite state from the state used to indicate "idle". The sample of line 51 is the case where there is no duty-cycle distortion. Sample 52 illustrates the case where the signal "high time" has been broadened and the "low time" narrowed. Sample 53 illustrates the opposite case for the two bits. For each of these cases, the adaptive data separator must determine which clock signal provides the best sampling point for the remaining data in the packet. As can be noticed from FIG. 4, despite the various duty-cycle distortion effects, the rise time to rise time difference is equal for all three samples. Thus, once the optimal sampling location for a bit cell in the two preamble bits is established, it is that point in each cell of the data packet which will yield the best results for sampling the entire packet. This results because the duty-cycle distortion for a given transmission packet is systematic as described above.

Line 50 of FIG. 4 indicates the clock signal timing with respect to the three data samples. As can be seen, the first orck clock signal corresponds to the first rising edge of each wave packet. In the ideal case in which no duty-cycle distortion is introduced, the second orck signal would correspond to the falling edge of the first bit cell as is the case for line 51. Each of the two-bit samples have a number of X's indicating the time increments from orck, orck5, orck10 and orck15, each of which is successively delayed 5 nanoseconds from the preceding orck signal. The present invention must determine which of these clock signals is the optimum one to use for sampling the level of the bit cell. For the no duty-cycle distortion case of sample 51, it can be seen that sampling the bit cells using the clock signal orck10 would be ideal. This places the sampling point right in the middle of a bit cell, not near any of the edges. Being close to a bit cell's clock edge can cause metastability uncertainties in the bit sample. For the case of sample 53, where the high time has been narrowed, it can be seen that the orck5 clock signal provides the only reliable clock for sampling the bits in the following data packet. Conversely, for the broadened high time sample line 52, only the orck15 clock signal will result in accurate reads for the following packet. Once a clock has been selected as optimum for the two preamble bits, the entire data packet following those bits should be read using the same clock.

Referring back now to FIG. 3, the circuitry for sampling the two preamble bits and selecting the appropriate clock signal will be described in detail. The differential data RXD 20, in addition to being supplied to the clock extraction circuitry 16, is also passed to the adaptive data separator circuitry, initially through delay circuit 21 which delays arrival of the data to the adaptive data separator while the clock signals are extracted. The delay circuit 21 compensates for the delay introduced by the rising edge one shot and the OR gate in the clock extraction circuit 16. This data is then passed to a first rank of flip-flops 22, 23 and 24. Because the preferred embodiment of the present invention anticipates the RXD signal to be differential, the first rank of flip-flops comprise fully differential flip-flops. In an alternative embodiment in which the data signal is already at CMOS digital levels, the first rank of flip-flops may be incorporated as digital level or CMOS level flip-flops. The data signal is sampled by the first rank of flip-flops, with flip-flop 22 sampling the data on the orck5 clock signal, flip-flop 23 sampling on the orck10 clock signal and flip-flop 24 sampling on the orck15 clock signal. These sampled values of the three respective points in the bit are then converted to CMOS digital levels by differential-to-CMOS converters 25, 26 and 27, respectively. The resulting outputs of converters 25, 26 and 27 are the digital level signals indicated as q5, q10 and q15 corresponding to the sampling of the bit cell at the three successively delayed orck clock signals. These three bits are then stored in the flip-flops 29, 30 and 31, respectively, each of which is clocked to the same orck clock signal.

The reason the second rank of flip-flops 29, 30 and 31 are clocked to the orck clock signal is so that the logic circuits to be described further herein need not be designed to run off three different clock signals. While the first preamble bit from a packet is being stored in the second rank of flip-flops 29, 30 and 31, the second preamble bit is being sampled by the first rank of differential flip-flops 22, 23 and 24. The first test bit samples are then propagated to the third rank of flip-flops 32, 33 and 34 while the second preamble bit samples are converted by differential-to-CMOS converters 25, 26 and 27 and stored in the second rank of flip-flops 29, 30 and 31.

Once the preamble bits for a data packet have been sampled and latched in the second and third ranks of flip-flops, it is convenient to label each of the stored values. The third rank of flip-flops 32, 33 and 34 each contains the digital values of the first sampled data bit taken on the orck5, orck10 and orck15 clock signals, respectively. Each will be referred to as values q5s2, q10s2 and q15s2, respectively. Likewise, for the second sampled bit latched in the second rank of flip-flops 29, 30 and 31, q5s1, q10s1 and q15s1 each correspond to the three successive time samples. These references are also indicated graphically at the various sampling points in FIG. 4.

In order to make the selection as to which clock the data packet should be sampled at, the values of q5s1, q10s1, q15s1 and q5s2, q10s2 and q15s2 are each supplied in parallel to logic circuit 35. The logic circuit 35 incorporates all the logic circuitry for carrying out the various functions to be described further herein. The circuitry may comprise random logic or a programmable logic array (PLA) or be uniquely designed to carry out the functions described. Those skilled in the art, once described the functions to be carried out by the logic 35 will be able to implement the present invention without undue experimentation. The output of logic 35 is clocked to coincide with the orck clock signal because the latched data samples have been similarly clocked in the second and third ranks of flip-flops. The logic 35 begins its operation on the third orck clock signal because it takes three clocks for both bits to be sampled and to be latched into the two ranks of flip-flops. It can be seen in FIG. 3 that the logic 35 is clocked to the output of the third delay line from the clock extraction circuit 16.

As was described with respect to FIG. 4, one of the three clock signals, orck5, orck10 or orck15 will be the optimal one for sampling all the data in the packet trailing the two preamble bits. If the clock to use is orck5 then logic 35 will output signal $d \times 5$ in a high state with $d \times 10$ and $d \times 15$ in a low state. Likewise, if the optional clock signal should be orck10 or orck15 then either $d \times 10$ or $d \times 15$ output signals will be in a high state with the other two being in a low state. The following formulas are those implemented by logic circuit is for determining which clock signal to output in the high state note that the '^' symbol indicates the logical NOT for the value it precedes):

$$d \times 5 = ((\wedge q5s1 \cdot \wedge q10s1 \cdot \wedge q15s1 \cdot q5s2 \cdot \wedge q15s2) \cdot \wedge PK\text{-}T) + sel5 \quad (1)$$

$$d \times 10 = ((\wedge q5s1 \cdot \wedge q10s1 \cdot \wedge q15s1 \cdot q5s2 \cdot q10s2 \cdot q15s2) \cdot PKT) + sel10 \quad (2)$$

$$d \times 15 = ((q5s1 \cdot \wedge q15s1 \cdot q5s2 \cdot q10s2 \cdot q15s2) \cdot \wedge PKT) + sel15 \quad (3)$$

$$PKT = sel5 sel10 + sel15 \quad (4)$$

The Boolean expressions for determining whether $d \times 5$, $d \times 10$ or $d \times 15$ should go active correspond to the selection criteria described with respect to FIG. 4 for selecting orck5, 10 or 15 clock signals. The logic 35 makes its determination based on the input values of samples q5s1–q15s2. Only one of the three signals, $d \times 5$, $d \times 10$ or $d \times 15$ will go active, based on the result of the Boolean evaluation. It is worth noting that the parallel evaluation for $d \times 5$, and $d \times 15$ do not rely on all six sampled values for the determination. For example, in evaluating $d \times 5$ if the q5s2 sample is high and the q15s2 sample is low, then the q10s2 sample is disregarded because it can be presumed to be metastable (near a clock edge) as indicated by data sample line 53 in FIG. 4.

When the proper clock has been selected by the logic 35, the three dx signals are propagated to the fourth rank of flip-flops 37, 38 and 39 where they are latched. As stated, only one of the three values will be high while the remaining are low. The values latched in the fourth rank of flip-flops are then propagated back to the logic 35 through select lines sel5, sel10 and sel15. The purpose of this is to freeze the logic. Once the proper clock has been selected, only that clock will be used for the remainder of the packet. Thus, if the orck5 clock signal has been selected, and the $d \times 5$ signal is high then the sel5 signal will be high and the logic will freeze ensuring that all data will be sampled on the orck5 clock signal. Another effect of routing the select lines back to the logic 35 is another important aspect of the present invention. As indicated by Boolean expressions above, the PKT signal is the OR of the sel5, sel10 and sel15 signals. Accordingly, the PKT signal only goes high when one of three clock signals has been selected for sampling the data. This advantageously provides a packet detect signal because the PKT signal only goes high when a packet has been received and the duty-cycle distortion determined and compensated for.

The fifth and final rank of flip-flops 40, 41, and 42 also each receive the sel5, sel10 and sel15 signals, with each of the three flip-flops 40, 41 and 42 being clocked to orck5, orck10 and orck15, respectively. It is necessary to sample the data packet on the selected orck5, 10 or 15 clock signal, not the orck clock signal which was used by the processing logic. This is necessary to synchronize the multiplexer's enables to the clock and data selected. The fifth rank of flip-flops then output enable signals en5, en10 and en15, respectively, to the multiplexers 43 and 44. Multiplexer 43 receives the orck5, orck10 and orck15 clock signals from the clock extraction circuit 16. Only one of the enable signals en5, en10 or en15 will be high thus selecting the appropriate orck clock signal to be output as RXCK clock signal 45. Multiplexer 44 receives as input the three CMOS digital level sampled bit values q5, q10 and q15 output from the differential to CMOS converters 25, 26 and 27. According to whichever enable signal en5, en10 or en15 is high, the appropriately sampled digital value is output as RXDNRZI data 46. Thus, if it was determined that orck5 was the appropriate signal upon which to sample the data in the packet then the output from multiplexer 43, RXCK signal 45 will correspond exactly to the orck5 clock signal and the RXDNRZI data 46 output from multiplexer 44 will correspond to the digital data sampled at the orck5 clock signal in each bit cell of the packet.

Although only two preamble bits are required for making the decision about a proper clock, there is an additional time requirement to propagate that decision to the multiplexer enables. Thus, in the preferred embodiment of the present two bits worth of padding should follow the preamble bits, with the useful data in the packet beginning with the fifth bit cell. Thus it can be seen in FIGS. 5, 6, and 7 that the RXDNRZI data line first goes active during the fifth clock cycle. Those skilled in the art may of course envision alternative logic arrangements which provide for packet information following immediately behind the two preamble bits. Once the entire packet has been received, a reset signal may be triggered to reset the logic of the present invention to wait for the next packet which may have undergone different duty-cycle distortion than the one just processed.

Figure 5:
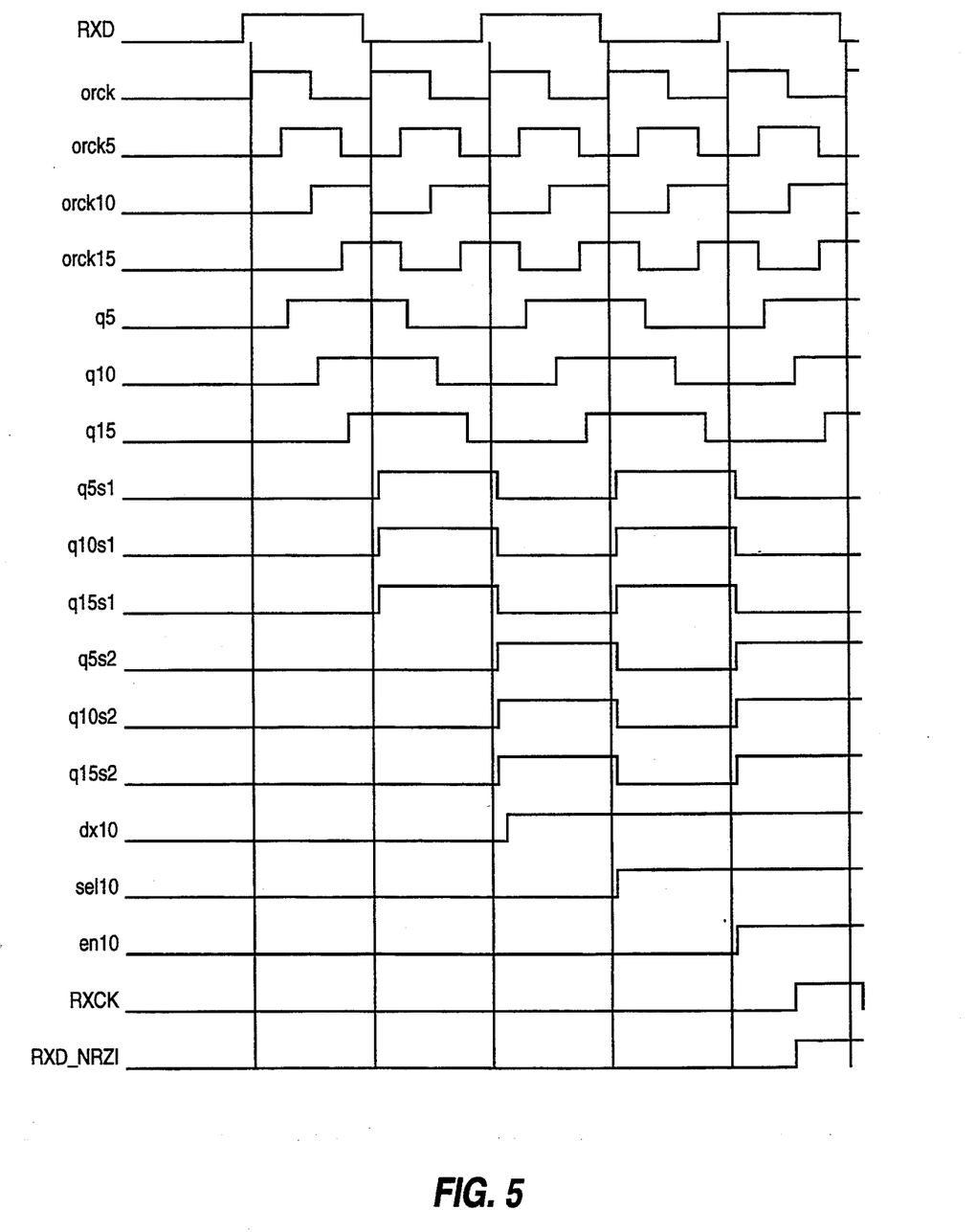
FIG. 5 is a graphical illustration of signal timing states for all relevant nodes in the adaptive data separator of the present invention where no duty-cycle distortion is present.
Figure 6:
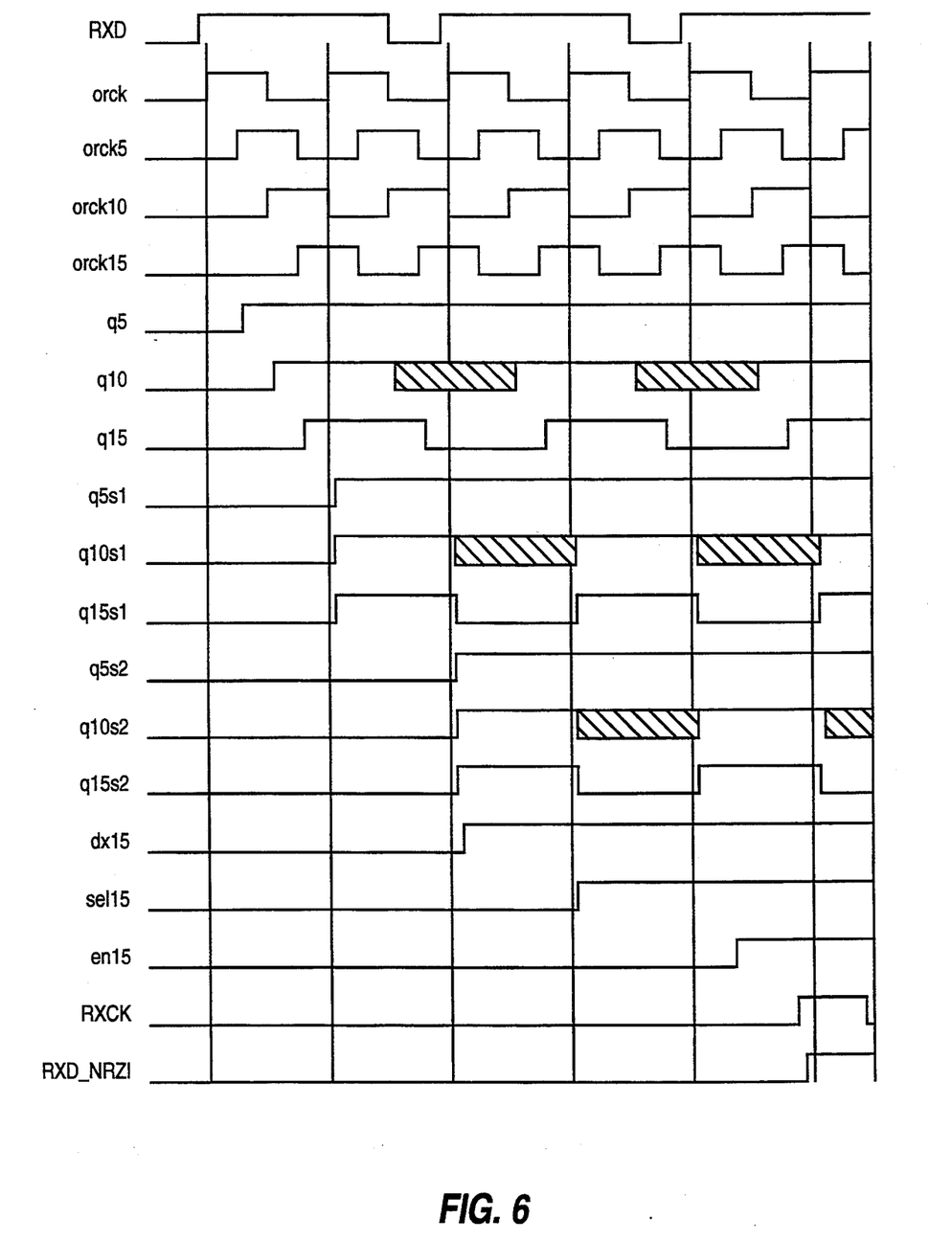
FIG. 6 is a graphical illustration of signal timing states for all relevant nodes in the adaptive data separator of the present invention in the presence of duty-cycle distortion resulting in late falling edges.
Figure 7:
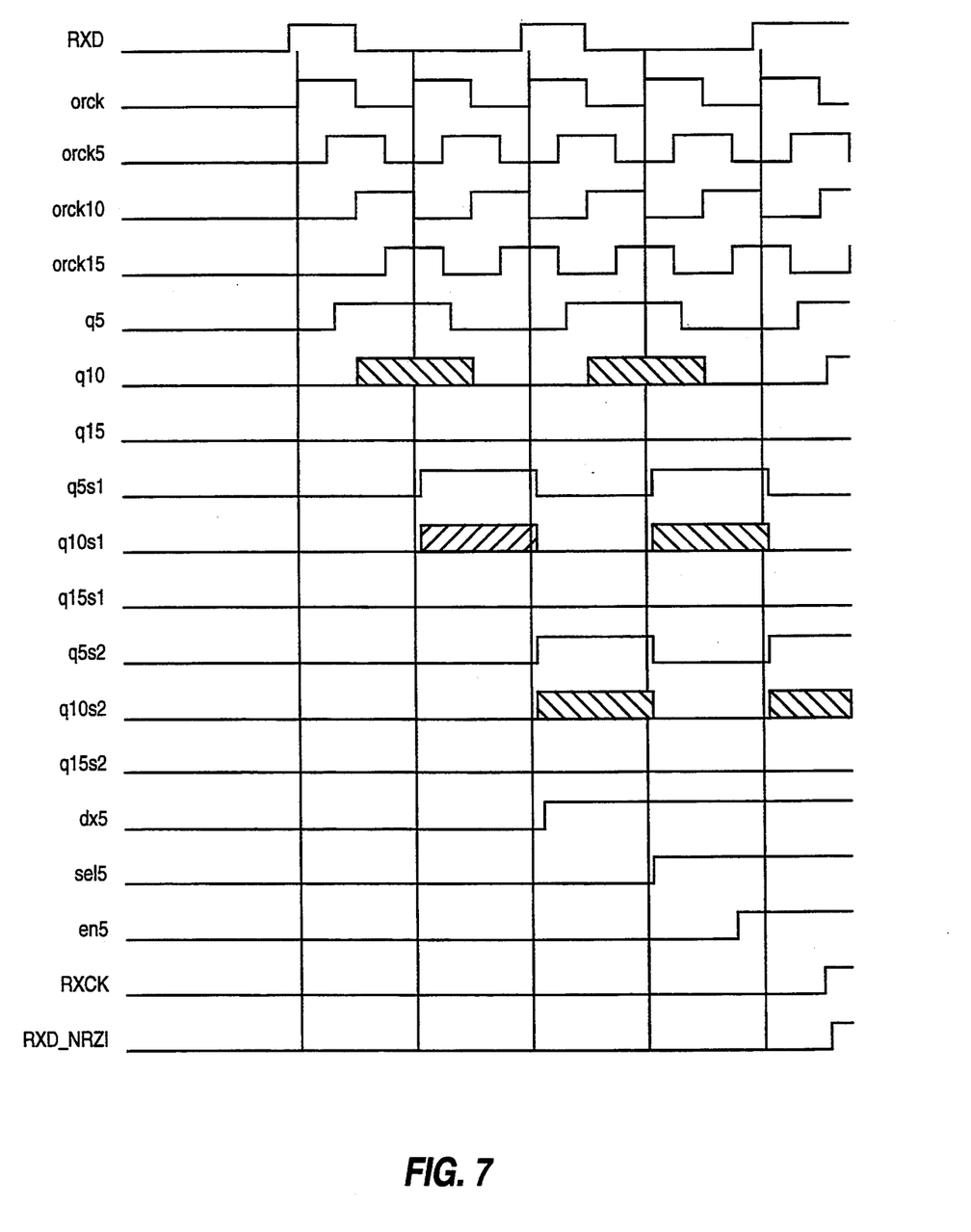
FIG. 7 is a graphical illustration of signal timing states for all relevant nodes in the adaptive data separator of the present invention in the presence of duty-cycle distortion resulting in early falling edges.

Throughout the description of the preferred embodiment, numerous clock signals have been described at various points in the circuitry corresponding to the signal processing. FIGS. 5, 6 and 7 illustrate all pertinent signal timing diagrams for the nominal, late falling edge case and early falling edge cases, respectively. These figures are enclosed for illustrative purposes to further describe the present invention.

There has been described a robust adaptive data separator suitable and ideally used for packet transmission serial data which may be subject to various duty-cycle distortions. The preferred embodiment receiver adapts on the first two bits of every packet because different packets, depending on their source, undergo different duty-cycle distortion. While certain exemplary embodiments have been described and shown in the accompanying drawings, it is to be understood that such embodiments are merely illustrative of and not restrictive on the broad invention, and that this invention not be limited to the specific instructions and arrangement shown and described, since various other modifications may occur to those having ordinary skill in the art.

What is claimed is:

1. An adaptive data separator for determining an optimal clock signal for sampling a packet of serial data which may suffer duty-cycle distortion, said packet of serial data having a predetermined sequence of initial bit values, said packet of serial data comprising a plurality of bit cells each having a predetermined pulse width (W) when transmitted which may undergo distortion during signal propagation, said adaptive data separator comprising:

signal sampling circuitry for sampling said predetermined sequence of initial bit values each on a plurality of different clock signals;

comparing logic circuitry for comparing the samples of said predetermined sequence of initial bit values to known values for determining which of said plurality of different clock signals is the optimal clock signal for sampling said packet of serial data; and signal selection circuitry for outputting said optimal clock signal and a signal corresponding to data values of said plurality of bit cells sampled on said optimal clock signal, wherein said predetermined sequence of initial bit values comprises first and second test bit cells having opposite values.

2. The adaptive data separator of claim 1 wherein said signal sampling circuitry comprises a first rank of flip-flops for receiving said packet of serial data, each of said first rank of flip-flops being clocked to a different one of said plurality of clock signals.

3. The adaptive data separator of claim 2 wherein said first rank of flip-flops comprises first, second and third flip-flops and said plurality of clock signals comprises first, second and third clock signals, each of said plurality of clock signals periodic in W, said first clock signal beginning at a time W/4 after a first transition edge of said serial data packet, said second clock signal trailing said first clock signal by a time equal to W/4 and said third clock signal following said second clock signal by a time equal to W/4.

4. The adaptive data separator of claims 3 wherein said packet of serial data is transmitted at differential levels and said first, second and third flip-flops are fully differential and said adaptive data separator further comprises first, second and third differential-to-CMOS converters coupled to said first, second and third flip-flops, respectively, for converting differential samples in said first rank of flip-flops to CMOS digital levels.

5. The adaptive data separator of claim 3 further comprising second and third ranks of flip-flops, each having three flip-flops, said second rank of flip-flops having D inputs coupled to said first rank of flip-flop's Q outputs, said third rank of flip-flops having D inputs coupled to Q outputs of said second rank of flip-flops, said second rank of flip-flops latching the sampled value of said second cell of said predetermined sequence of initial bit values sampled at said first, second and third clock signals, respectively, said third rank of flip-flops latching the sampled value of said first cell of said predetermined sequence of initial bit values sampled at said first, second and third clock signals.

6. The adaptive data separator of claim 5 wherein said comparing logic circuitry comprises circuitry for evaluating the following Boolean expressions:

$$d \times 5 = {\wedge}q5s1 \cdot {\wedge}q10s1 \cdot {\wedge}q15s1 \cdot q5s2 \cdot {\wedge}q15s2 \quad (1)$$

$$d \times 10 = {\wedge}q5s1 \cdot {\wedge}q10s1 \cdot {\wedge}q15s1 \cdot q5s2 \cdot q10s2 \cdot q15\,s2 \quad (2)$$

$$d \times 15 = q5s1 \cdot {\wedge}q15s1 \cdot q5s2 \cdot q10s2 \cdot q15s2 \quad (3)$$

wherein q5s1-q15s1 are the sampled values latched in said second rank of flip-flops and q5s2-q15s2 are the sampled values latched in said third rank of flip-flops, wherein $d \times 5$ will be in a high state if said first clock signal is said optimal clock signal, $d \times 10$ will be in a high state if said second clock signal is said optimal clock signal and $d \times 15$ will be in a high state if said third clock signal is said optimal clock signal, and wherein '$\wedge$' denotes the logical NOT operation for the value it precedes.

7. The adaptive data separator of claim 6 wherein said comparing logic circuitry further comprises circuitry for generating a packet detect signal after said first and second test bit cells have been sampled.

8. The adaptive data separator of claim 6 wherein said signal selection circuitry comprises:

fourth and fifth ranks of flip-flops responsive to $d \times 5$, $d \times 10$ and $d \times 15$, said fifth rank of flip-flops having 3 flip-flops clocked to said first, second and third clock signals, respectively; and multiplexing logic for selecting said optimal clock signal to output and said data packet bit cells sampled as said optimal clock signal.

9. The adaptive data separator of claim 3 wherein said pulse-width W is 20 nanoseconds and said first, second and third clock signals are each successively delayed by 5 nanoseconds.

10. An adaptive data separator for receiving serial data packets comprising a plurality of data bit cells each having a transmitted pulse-width (W), said plurality of data bit cells including first and second bit cells at the beginning of said packet, said first and second bit cells having known and opposite values, said adaptive data separator receiving first, second, third and fourth clock signals, each periodic over time W, said first clock signal beginning with a first transition edge of said data packet, said second, third and fourth clock signals each successively delayed on amount equal to W/4 and following said first clock signal, said adaptive data separator comprising:

first, second and third flip-flops respectively clocked to said second, third and fourth clock signals for sampling said plurality of bit cells corresponding to said second, third and fourth clock signals;

storage means for holding six values corresponding to said first and second bit cells sampled on said second, third and fourth clock signals, said storage means clocked to said first clock signal;

logic means clocked to said first clock signal and coupled to said storage means for receiving said six values and determining which of said second, third or fourth clock signals is a preferred clock signal for sampling said plurality of bit cells in said data packet; and signal output means responsive to said logic means for conveying said preferred clock signal and said samples of said plurality of bit cells sampled on said preferred clock signal.

11. The adaptive data separator of claim 10 wherein said storage means comprises:
   a fourth flip-flop coupled to said first flip-flop for latching q5s1, a sample of said second bit cell sampled on said second clock signal;
   a fifth flip-flop coupled to said second flip-flop for latching q10s1, a sample of said second bit cell sampled on said third clock signal;
   a sixth flip-flop coupled to said third flip-flop for latching q15s1, a sample of said second bit cell sampled on said fourth clock signal;
   a seventh flip-flop coupled to said fourth flip-flop for latching q5s2, a sample of said first bit cell sampled on said second clock signal;
   an eighth flip-flop coupled to said fifth flip-flop for latching q10s2, a sample of said first bit cell sampled on said third clock signal; and
   a ninth flip-flop coupled to said sixth flip-flop for latching q15s2, a sample of said first bit cell sampled on said fourth clock signal.

12. The adaptive data separator of claim 11 wherein said first bit cell corresponds to a high logic state and said second bit cell corresponds to a low logic state, said logic means comprising means for evaluating the following Boolean expressions:

$$d \times 5 = \wedge q5s1 \cdot \wedge q10s1 \cdot q15s1 \cdot q5s2 \cdot \wedge q15s2 \quad (1)$$

$$d \times 10 = \wedge q5s1 \cdot \wedge q10s1 \cdot \wedge q15s1 \cdot q5s2 \cdot q10s2 \cdot q15s2 \quad (2)$$

$$d \times 15 = q5s1 \cdot \wedge q15s1 \cdot q5s2 \cdot q10s2 \cdot q15s2 \quad (3)$$

wherein q5s1, q10s1, and q15s1 are the sampled values latched in said fourth, fifth and sixth flip-flops, respectively, and q5s2, q10s2 and q15s2 are the sampled values latched in said seventh, eighth and ninth flip-flops, respectively, wherein one of d×5, d×10 or d×15 will be in a high logic state according to whether said second, third or fourth clock signals, respectively, is said preferred clock signal, and wherein '∧' denotes the logical NOT of the value it precedes.

13. The adaptive data separator of claim 12 wherein said logic means further comprises means for generating a packet detect signal after evaluating said Boolean expressions.

14. The adaptive data separator of claim 10 wherein said serial data packets comprise combined clock and data information, said adaptive data separator further being coupled to a delay line separator for extracting said clock information and generating said first, second, third and fourth clock signals.

15. The adaptive data separator of claim 14 further comprising delay means coupled to said first, second and third flip-flops for delaying said data packets while said clock signals are being extracted.

16. A method of detecting data signals received along a serial data line, said data signals being transmitted in data packets defining a plurality of data bit cells having a transmitted width (W), said method comprising the steps of:
   providing said data packets with a predetermined sequence of initial bit cells, wherein said predetermined sequence of initial bit cells comprises first and second bit cells representing opposite logical values;
   sampling said predetermined sequence of initial bit cells on a plurality of different clock signals periodic in W;
   logically evaluating which of said plurality of different clock signals is a best clock signal for detecting said plurality of data bit cells; and
   outputting said best clock signal and a signal corresponding to said bit cells sampled on said best clock signal.

17. The method according to claim 16 wherein said sampling step further comprises the step of latching the sampled values of said first and second bit cells in a plurality of storage means.

18. The method of claim 16 wherein said plurality of different clock signals comprises N clock signals periodic in W and successively delayed by an amount equal to $W/(N+i)$, wherein N is an integer value greater than 1.

19. The method of claim 18 wherein W is 20 nanoseconds and N is three.

20. The method of claim 18 wherein said data packets comprise combined clock/data information, said method further comprising the steps of:
   extracting said clock information from said combined clock/data information; and
   generating said plurality of clock signals according to said clock information.

21. The method of claim 16 wherein said data packets comprise differential level signals, said method further comprising the step of converting said differential level signals to CMOS digital levels.

* * * * *